(12) United States Patent
Gallucci

(10) Patent No.: US 7,709,576 B2
(45) Date of Patent: May 4, 2010

(54) PROCESS FOR THE PREPARATION OF SULFONATE AND SULFONATE SALT CAPPED POLYARYLATE RESINS WITH IMPROVED FLOW

(75) Inventor: Robert Russell Gallucci, Mt. Vernon, IN (US)

(73) Assignee: SABIC Innovative Plastics IP B.V., Bergen op Zoom (NL)

( * ) Notice: Subject to any disclaimer, the term of this patent is extended or adjusted under 35 U.S.C. 154(b) by 1 day.

(21) Appl. No.: 12/059,285

(22) Filed: Mar. 31, 2008

(65) Prior Publication Data

US 2009/0247707 A1    Oct. 1, 2009

(51) Int. Cl.
*C08G 63/685* (2006.01)
*C08G 63/688* (2006.01)
*C08G 63/88* (2006.01)

(52) U.S. Cl. .................. 525/189; 525/23; 525/67; 525/437; 528/172; 524/159; 524/166; 524/157

(58) Field of Classification Search ............. 525/67, 525/437, 293, 23, 189; 524/159, 166, 157; 528/172
See application file for complete search history.

(56) References Cited

U.S. PATENT DOCUMENTS

| 3,803,085 | A |  | 4/1974 | Takehoshi et al. |
|---|---|---|---|---|
| 3,847,867 | A |  | 11/1974 | Heath et al. |
| 3,850,885 | A |  | 11/1974 | Takekoshi et al. |
| 3,852,242 | A |  | 12/1974 | White |
| 3,855,178 | A |  | 12/1974 | White et al. |
| 3,905,942 | A |  | 9/1975 | Takekoshi et al. |
| 3,972,902 | A |  | 8/1976 | Heath et al. |
| 3,983,093 | A |  | 9/1976 | Williams, III et al. |
| 4,443,591 | A |  | 4/1984 | Schmidt et al. |
| 4,455,410 | A |  | 6/1984 | Giles, Jr. |
| 4,588,805 | A |  | 5/1986 | Williams, Jr. |
| 4,609,997 | A |  | 9/1986 | Matsuyama |
| 4,663,421 | A | * | 5/1987 | Mark ................... 528/176 |
| 4,808,686 | A |  | 2/1989 | Cella et al. |
| 5,280,085 | A |  | 1/1994 | Rock et al. |
| 7,148,314 | B2 | * | 12/2006 | Gallucci et al. ........... 528/310 |
| 2006/0287473 | A1 | * | 12/2006 | Fukui et al. ............. 528/272 |

FOREIGN PATENT DOCUMENTS

JP    2007133201 A  *  5/2007

OTHER PUBLICATIONS

Full English Translation of JP 2007133201.*
ASTM D-1238-04, "Standard Test Method for Melt Flow Rates of Thermoplastics by Extrusion Plastometer", pp. 1-13.

* cited by examiner

*Primary Examiner*—Vasu Jagannathan
*Assistant Examiner*—Mark S Kaucher

(57) ABSTRACT

A process for preparing a sulfonate terminated polyarylate comprises blending a polyarylate resin with an organic compound to form a reaction mixture, wherein the organic compound contains at least one aliphatic primary amine functional group and at least one other functional group selected from the group consisting of sulfonic acids, sulfonic acid salts, and mixtures thereof, and heating the reaction mixture to a temperature of 225 to 400° C. The temperature of heating is above the glass transition temperature of the polyarylate resin. Sulfonate terminated polyarylates and compositions prepared using the above process, and articles comprising the sulfonate terminated polyarylate compositions, are also disclosed.

15 Claims, 1 Drawing Sheet

FIGURE
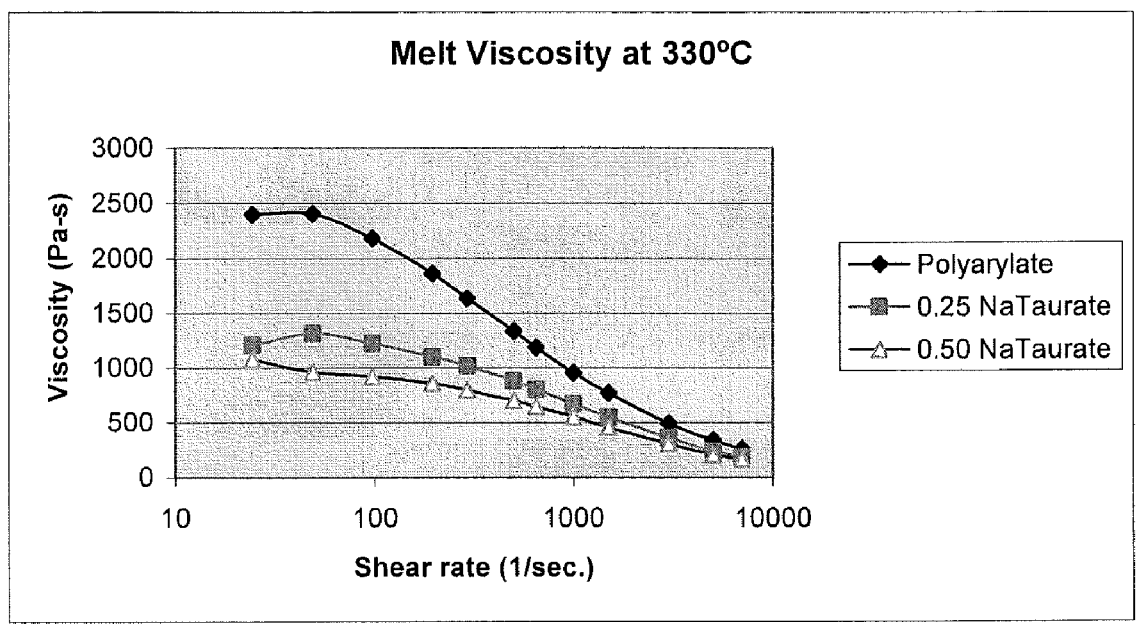

PROCESS FOR THE PREPARATION OF SULFONATE AND SULFONATE SALT CAPPED POLYARYLATE RESINS WITH IMPROVED FLOW

BACKGROUND OF THE INVENTION

This disclosure relates to a process for preparing sulfonate and sulfonate salt capped polyarylate resins, and specifically to a process for preparing sulfonate and sulfonate salt capped polyarylate resins having improved flow, compositions thereof, and articles formed therefrom.

Polyarylates are well known engineering thermoplastics made by condensation polymerization, typically by either solution or melt polymerizing an aromatic diacid compound (a diester in the case of a melt polymerization, or a diacid chloride in the case of a solution polymerization) and a diol, such as an aromatic diol (e.g., a diphenol compound). Polyarylates typically have high thermal and chemical stability, and can also have photolytic stability and are desirable for use in weatherable compositions. However, due to their high Tg and relatively stiff backbone these polymers are difficult to melt process.

There accordingly remains a need in the art for polyarylate resins and thermoplastic compositions comprising such resins, which have improved melt flow.

SUMMARY OF THE INVENTION

The above deficiencies in the art are alleviated by, in an embodiment, a process for preparing a sulfonate terminated polyarylate, comprising blending a polyarylate resin with an organic compound to form a reaction mixture, wherein the organic compound contains at least one aliphatic primary amine functional group and at least one other functional group selected from the group consisting of sulfonic acids, sulfonic acid salts, and mixtures thereof, and heating the reaction mixture to a temperature of 225 to 400° C.

In another embodiment, a sulfonate terminated polyarylate comprises the following structure;

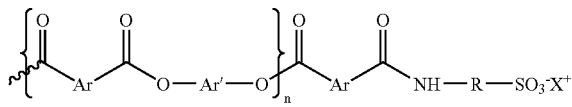

where Ar and Ar' are each independently a $C_{6-36}$ aryl group, n is 10 to 1,000, R is an organic group of at least two carbon atoms, and X is hydrogen, alkali metal, or alkaline earth metal.

In another embodiment, a sulfonate terminated polyarylate comprises the following structure;

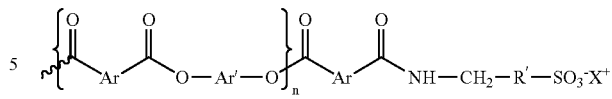

where Ar and Ar' is a $C_{6-36}$ aryl group, n is 10 to 1,000, R' is an organic group of at least one carbon atom, and X is hydrogen, alkali metal or alkaline earth metal.

In another embodiment, a sulfonate terminated polyarylate comprises the following structure:

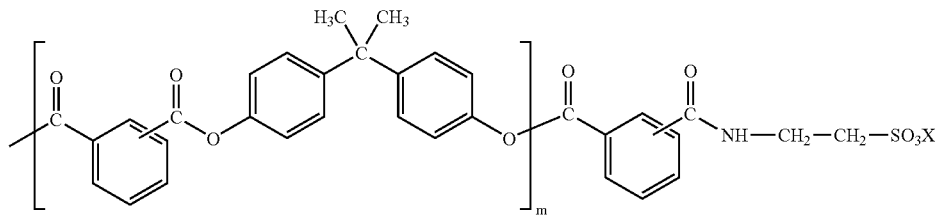

wherein m is greater than or equal to 10, and X is hydrogen, lithium, sodium, potassium, cesium, magnesium, calcium, or zinc.

A description of the FIGURE, which is meant to be exemplary and not limiting, is provided below.

BRIEF DESCRIPTION OF THE FIGURE

The FIGURE is a plot of viscosity vs. shear rate for Examples 1 and 2 of sulfonate terminated polyarylates, and an unmodified polyarylate Comparative Example.

The above described and other features are exemplified by the following detailed description.

DETAILED DESCRIPTION OF THE INVENTION

Surprisingly, it has been found that melt combining an amino sulfonic acid, or its salt, with a polyarylate (PAr) gives sulfonate terminated (i.e., "capped") polyarylate resins (ionophores) with improved flow. An increase in melt flow rate (MFR) of 1 to 100 cc/10 min is obtained as measured at 300° C. under a load of 1.26 Kg according to ASTM D1238-04. In addition, the sulfonate terminated polyarylate has shear thinning behavior that varies less than that of an unmodified polyarylate.

As used herein, the term "hydrocarbyl" refers to a straight or branched chain, substituted or unsubstituted hydrocarbon group including aromatic and/or aliphatic groups; the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicylic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any one or more hydrogens on the designated atom or group are replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound.

The sulfonate terminated polyarylate comprises a polyarylate resin. Polyarylates, sometimes referred to herein as poly(arylene esters), contain ester chain units of the formula (1):

(1)

wherein D is a divalent radical derived from a dihydroxy compound, and may be, for example, a $C_{6-36}$ aromatic group or $C_{7-36}$ alkyl aromatic group; and T divalent group derived from a dicarboxylic acid, and may be, for example, a $C_{7-36}$ alkyl aromatic group or a $C_{6-36}$ aromatic group.

Polyarylates having a polyester structure according to formula (1) comprise T groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Thus, in formula (1), where T is 1,4-phenylene, the polyarylate is a poly(arylene terephthalate).

In a specific embodiment, the arylate units have the structure of formula (2):

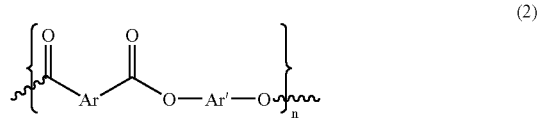

(2)

wherein Ar and Ar' are each independently $C_{6-36}$ aryl groups, and n is greater than 10. In a more specific embodiment, Ar is a $C_6$ aromatic group with meta and para attachment (iso and terephthalate derived).

Examples of aromatic dicarboxylic acids or derivatives thereof from which Ar in formula (2) is derived and which can be used to prepare the polyesters include isophthalic or terephthalic acid, alkyl esters of isophthalic or terephthalic acid such as dimethyl iso/terephthalate, diacid chlorides of iso/terephthalic acids, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific useful dicarboxylic acids are terephthalic acid, isophthalic acid, naphthalene dicarboxylic acid, cyclohexane dicarboxylic acid, derivatives thereof, or mixtures thereof. A specific dicarboxylic acid comprises a mixture of isophthalic acid and terephthalic acid wherein the weight ratio of isophthalic acid to terephthalic acid is 91:9 to 2:98. In an embodiment, Ar comprises a mixture of iso- and terephthalate present in a mole percentage ratio of, respectively, 90:10 to 10:90, specifically 25:75 to 75:25, and more specifically 60:40 to 40:60. In another specific embodiment, Ar' is a $C_{6-36}$ arylene group and Ar is p-phenylene, m-phenylene, naphthalene, a divalent cycloaliphatic group, or a mixture thereof.

Polyarylates may be produced by the reaction of dihydroxy compounds having the formula HO—$R^1$—OH. In an embodiment, $R^1$ has the general structure $A^1$-$Y^1$-$A^2$, which includes dihydroxy compounds of formula (3):

HO-$A^1$-$Y^1$-$A^2$-OH (3)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ may be a hydrocarbon group or a saturated hydrocarbon group such as methylene, cyclohexylidene, or isopropylidene.

Also included are bisphenol compounds of general formula (4):

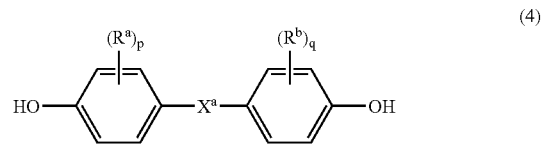

(4)

wherein $R^a$ and $R^b$ each represent a halogen atom or a monovalent hydrocarbon group and may be the same or different; p and q are each independently integers of 0 to 4; and $X^a$ represents one of the groups of formula (5):

(5)

wherein $R^c$ and $R^d$ each independently represent a hydrogen atom or a monovalent linear or cyclic hydrocarbon group and $R^e$ is a divalent hydrocarbon group.

In an embodiment, a heteroatom-containing cyclic alkylidene group comprises at least one heteroatom with a valency of 2 or greater, and at least two carbon atoms. Heteroatoms for use in the heteroatom-containing cyclic alkylidene group include —O—, —S—, and —N(Z)—, where Z is a substituent group selected from hydrogen, hydroxy, $C_{1-12}$ alkyl, $C_{1-12}$ alkoxy, or $C_{1-12}$ acyl. Where present, the cyclic alkylidene group or heteroatom-containing cyclic alkylidene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of formula (6):

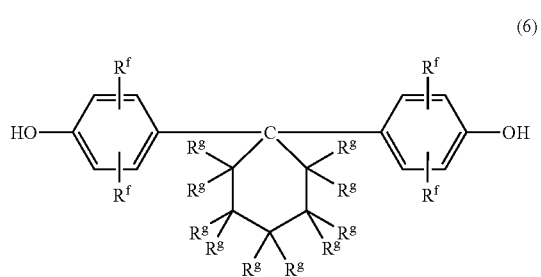

(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight chain, cyclic, bicyclic, branched, saturated, or unsaturated.

In another embodiment, useful dihydroxy compounds having the formula HO—$R^1$—OH include aromatic dihydroxy compounds of formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Exemplary dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl)phenylmethane, 2,2-bis(4-hydroxy-3-bromophenyl)propane, 1,1-bis(hydroxyphenyl)cyclopentane, 1,1-bis(4-hydroxyphenyl)cyclohexane, 1,1-bis(4-hydroxyphenyl)isobutene, 1,1-bis(4-hydroxyphenyl)cyclododecane, trans-2,3-bis(4-hydroxyphenyl)-2-butene, 2,2-bis(4-hydroxyphenyl)adamantine, (alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by formula (4) include 1,1-bis(4-hydroxyphenyl) methane, 1,1-bis(4-hydroxyphenyl)ethane, 2,2-bis(4-hydroxyphenyl) propane (hereinafter "bisphenol A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, 1,1-bis(4-hydroxy-t-butylphenyl) propane, 3,3-bis(4-hydroxyphenyl) phthalimidine, 2-phenyl-3,3-bis(4-hydroxyphenyl) phthalimidine (PPPBP), and 1,1-bis(4-hydroxy-3-methylphenyl)cyclohexane (DMBPC). Combinations comprising at least one of the foregoing dihydroxy compounds may also be used.

In an embodiment, Ar' of formula (2) is a group derived from the esterification of a diphenol. Examples include resorcinol, hydroquinone, bisphenols such as for example bisphenol A, isophorone bisphenol, N-phenyl phenolphthalein bisphenol, biphenol, cyclohexyl bisphenol, dimethyl cyclohexyl bisphenol, dimethyl bisphenol A, fluorenone bisphenol, and dimethyl fluorenone cresol, a mixture of bisphenols, or any combination of the foregoing diphenols.

In an embodiment, useful aromatic polyesters may include, for example, poly(isophthalate-terephthalate-resorcinol) esters, poly(isophthalate-terephthalate-bisphenol A) esters, poly[(isophthalate-terephthalate-resorcinol) ester-co-(isophthalate-terephthalate-bisphenol A)]ester, or a combination comprising at least one of these. Also contemplated are aromatic polyesters with a minor amount, e.g., from about 0.5 to about 20 percent by weight, of units derived from an aliphatic diacid and/or an aliphatic polyol to make co-polyesters.

Particularly useful polyarylates include those having repeating units of formula (8):

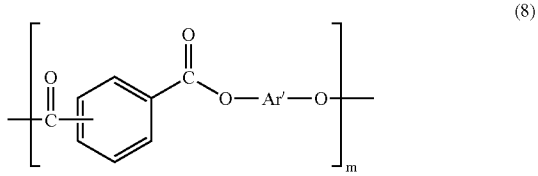

(8)

wherein Ar' is as previously defined for formula (2), and m is greater than or equal to 10. In an embodiment, m is 20 to 200. In another embodiment, the molar ratio of isophthalate to terephthalate can be about 0.25:1 to about 4.0:1. Useful polyarylates terminate in carboxylic acid groups, or groups comprising carboxylic acid derivatives.

In a specific embodiment, the polyarylates can comprise resorcinol polyarylates as illustrated in formula (8a):

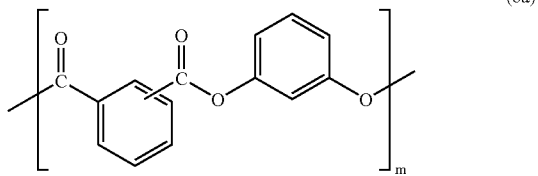

(8a)

wherein m is as described for formula (8).

In another specific embodiment, the polyarylates can comprise bisphenol A polyarylates as illustrated in formula (8b):

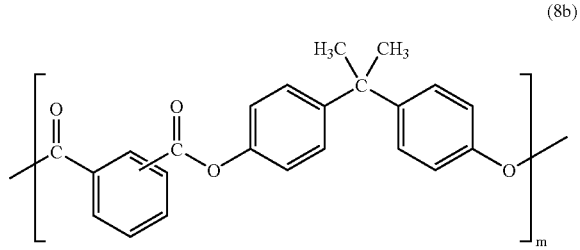

(8b)

wherein m is as described for formula (8). Such resins are sold commercially, for example by Unitika Co. under the tradename of U-Resins, an example of which is Unitika U-100 resin.

In yet another specific embodiment, the polyarylates can comprise a combination of resorcinol arylate units and bisphenol A units to provide a resorcinol-bisphenol A polyarylate having a block or random structure.

The polyarylate resin can have a weight-average molecular weight (Mw) of 7,000 to 150,000 g/mol, specifically 8,000 to 100,000 g/mol, and more specifically 9,000 to 70,000 g/mol. Molecular weights as disclosed herein are determined using gel permeation chromatography using crosslinked styrene-divinylbenzene columns calibrated to polystyrene standards, at an elution rate of 0.5 to 1.5 ml/min and a sample concentration of 1 mg/ml.

The polyarylate resin also has a glass transition temperature (Tg) of 150 to 300° C., specifically 160 to 290° C., and still more specifically 175 to 275° C.

Suitable polyarylate resins can be manufactured by processes such as interfacial polymerization and melt polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a diacid chloride precursor in the presence of a suitable catalyst such as triethylamine or a phase transfer catalyst, under controlled pH conditions, e.g., 8 to 10. The most commonly used water immiscible solvents include methylene chloride, 1,2-dichloroethane, chlorobenzene, toluene, and the like. Suitable diacid chlorides include isophthaloyl chloride, terephthaloyl chloride, mixtures of these, naphthaloyl chlorides, cyclohexanedicarboxylic acid dichloride, or the like. Combinations comprising at least one of the foregoing types of diacid chloride precursors may also be used.

A chain stopper (also referred to as a capping agent) may be included during polymerization. The chain stopper limits molecular weight growth rate, and so controls molecular weight in the polyarylate. A chain stopper may be at least one of mono-phenolic compounds, mono-carboxylic acid chlorides, and/or mono-chloroformates. Where a chain stopper is incorporated with the polyarylate, the chain stopper may also be referred to as an end group. It will be understood that chain stoppers can be used in the preparation of the polyarylates where the presence of chain stoppers does not significantly adversely affect the desirable functionality and properties of the polyarylate, or of a sulfonate terminated polyarylate prepared therefrom. In an embodiment, no chain stoppers are used in the preparation of the polyarylates used herein. In another embodiment, chain stoppers having terminal acid groups or acid derivatives may be used such that the polyarylate terminates in the acid group or acid derivative.

For example, mono-phenolic compounds suitable as chain stoppers include monocyclic phenols, such as phenol, $C_1$-$C_{22}$ alkyl-substituted phenols, p-cumyl-phenol, p-tertiary-butyl phenol, hydroxy diphenyl; monoethers of diphenols, such as p-methoxyphenol. Alkyl-substituted phenols include those with branched chain alkyl substituents having 8 to 9 carbon atoms. A mono-phenolic UV absorber may be used as capping agent. Such compounds include 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like. Specifically, mono-phenolic chain stoppers include phenol, p-cumylphenol, and/or resorcinol monobenzoate.

Mono-carboxylic acid chlorides may also be suitable as chain stoppers. These include monocyclic, mono-carboxylic acid chlorides such as benzoyl chloride, $C_1$-$C_{22}$ alkyl-substituted benzoyl chloride, 4-methylbenzoyl chloride, halogen-substituted benzoyl chloride, bromobenzoyl chloride, cinnamoyl chloride, 4-nadimidobenzoyl chloride, and mixtures thereof; polycyclic, mono-carboxylic acid chlorides such as trimellitic anhydride chloride, and naphthoyl chloride; and mixtures of monocyclic and polycyclic mono-carboxylic acid chlorides. Chlorides of aliphatic monocarboxylic acids with up to 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and mixtures thereof.

Among the phase transfer catalysts that may be used in interfacial polymerization are catalysts of the formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, [CH$_3$(CH$_2$)$_3$]$_4$NX, [CH$_3$(CH$_2$)$_3$]$_4$PX, [CH$_3$(CH$_2$)$_5$]$_4$NX, [CH$_3$ $(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is $Cl^-$, $Br^-$, a $C_{1-8}$ alkoxy group or a $C_{6-18}$ aryloxy group. In an embodiment, a specifically useful phase transfer catalyst is $CH_3[CH_3(CH_2)_3]_3NCl$ (methyl tri-n-butyl ammonium chloride). An effective amount of a phase transfer catalyst may be 0.1 to 10 wt % based on the weight of bisphenol in the polymerization.

Alternatively, melt processes may be used to make polyarylates. Generally, in the melt polymerization process, polyarylates may be prepared by co-reacting, in a molten state, the dihydroxy reactant(s) and a dicarboxylic acid ester, such as an alkyl or aryl iso/terephthalate, in the presence of a transesterification catalyst in a Banbury® mixer, twin screw extruder, or the like to form a uniform dispersion. Volatile components are removed from the molten reactants by distillation and the polymer is isolated as a molten residue. In addition, suitable transesterification catalyst for use may include phase transfer catalysts of formula $(R^3)_4Q^+X$ above, wherein each $R^3$, Q, and X are as defined above. Examples of suitable transesterification catalysts include metal oxides, metal alkoxides, tetrabutylammonium hydroxide, methyltributylammonium hydroxide, tetrabutylammonium acetate, tetrabutylphosphonium hydroxide, tetrabutylphosphonium acetate, tetrabutylphosphonium phenolate, or a combination comprising at least one of these.

In an embodiment, the polyarylate resin comprises an esterification product of the reaction of at least one bisphenol or a chemical equivalent of a bisphenol, wherein the bisphenol or chemical equivalent of a bisphenol is selected from the group consisting of bisphenol A, isophorone bisphenols, phenolphthalein bisphenols, N-alkyl phenolphthalein bisphenols, N-aryl phenolphthalein bisphenols, resorcinol, hydroquinone, biphenols, sulfo bisphenols, and mixtures thereof, and at least one dicarboxylic acid or chemical equivalent of a dicarboxylic acid, wherein the dicarboxylic acid or chemical equivalent of dicarboxylic acid is selected from the group comprising isophthalic acid, terephthalic acid, naphthalene dicarboxylic acids, $C_{2-20}$ alkylene dicarboxylic acids, $C_{16-44}$ acid dimers, and mixtures thereof.

Branched polyarylate resins can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents may be added at a level of about 0.05 to about 2.0 wt %. Mixtures comprising linear polyarylates and branched polyarylates can be used.

Polyarylate resins and sulfonate terminated polyarylate resins made from them that are substantially free of benzylic protons are desirable in some instances due to improved melt stability especially at melt processing temperatures above 300° C. In an embodiment, the polyarylate resin has less than 1,000 ppm, specifically less than 750 ppm, and still more specifically less than 500 ppm by weight of benzylic protons.

In another embodiment, the polyarylate is substantially free of halogens such as bromine, chlorine and iodine. Halogen free resins are desirable in some applications due to the need to comply with certain regulations. Halogen free polyarylate, especially those free of aliphatic halogen groups, will have better melt stability. Decomposition of halogenated polyarylates can lead to generation of halogen acids that can corrode processing equipment and molds. In addition, when decomposed, halogenated polyarylate or sulfonate polyarylate can give off acidic fumes that can damage sensitive electronic or optical equipment. In an embodiment, the polyarylate resin has less than 1,000 ppm, specifically less than 750 ppm, and still more specifically less than 500 ppm by weight of halogens.

The polyarylates are combined by blending with an organic compound to form a reaction mixture, wherein the organic compound contains at least one aliphatic primary amine functional group and at least one other functional group selected from the group consisting of sulfonic acids, sulfonic acid salts, and mixtures thereof.

In an embodiment, the organic compound has the structure of formula (9):

$$XO_3S—R—NH_2 \quad (9)$$

wherein X is hydrogen or a metal and wherein R of the organic compound contains at least two carbon atoms. In a specific embodiment, R is a $C_{2-36}$ alkylene group, $C_{6-36}$ arylene group, $C_{7-36}$ alkylenearylene group, or $C_{2-36}$ heterocyclic group. In a more specific embodiment, R is a $C_{2-10}$ alkylene group, $C_{6-14}$ arylene group, $C_{7-15}$ alkylenearylene group, or $C_{2-14}$ heterocyclic group. Also in an embodiment, where X is a metal, the metal is an alkali metal, an alkaline earth metal, or a mixture thereof. In an embodiment the organic compound of formula (9) can be added to the polyarylate in an amount of 0.1 to 10.0 wt %, based on the total weight of polyarylate and organic compound. In another embodiment, the organic compound of formula (9) can be added to the polyarylate in an amount of 0.3 to 5.0 wt % based on the total weight of polyarylate and organic compound.

In a specific embodiment, the organic compound has the structure of formula (9a):

$$XO_3S—R'—CH_2NH_2 \quad (9a)$$

wherein X is as described for formula (9), above, and R' of the organic compound contains at least one carbon atom. In a specific embodiment, R' is a $C_{1-36}$ alkylene group, $C_{6-36}$ arylene group, $C_{7-36}$ alkylenearylene group, or $C_{1-36}$ heterocyclic group. In a more specific embodiment, R' is a $C_{1-10}$ alkylene group, $C_{6-14}$ arylene group, $C_{7-15}$ alkylenearylene group, or $C_{1-14}$ heterocyclic group.

The organic compound can also be included in the reaction mixture as an aqueous solution. In a specific embodiment, the organic compound can be dissolved in water in an amount of greater than or equal to 25 wt %, specifically greater than or equal to 40 wt %, and more specifically greater than or equal to 50 wt %, based on the total weight of the aqueous solution. The aqueous solution of organic compound can subsequently be added to the polyarylate.

The reaction of the amino sulfonate compound with the polyarylate is best accomplished in the polymer melt in a continuous melt mixing device such as an extruder or wiped film evaporator at a temperature from 225 to 400° C. In other instance the melt temperature can be from 250 to 350° C.

In an embodiment, a sulfonate terminated polyarylate prepared from a polyarylate and the organic compound of formula (9) by the above process comprises the structure of Formula (10):

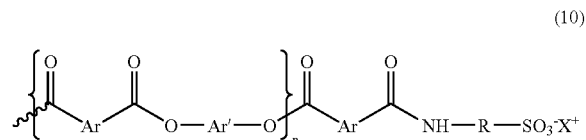

(10)

where Ar and Ar' are each independently a $C_{6-36}$ aryl group, n is 10 to 1,000, R is an organic group of at least two carbon atoms, and X is a hydrogen, alkali metal, or alkaline earth metal. In a specific embodiment, R is an organic group of at least two carbon atoms. In a specific embodiment, R is a $C_{2-36}$ alkylene group, $C_{6-36}$ arylene group, $C_{7-36}$ alkylenearylene group, or a $C_{2-36}$ heterocyclic group. In a more specific embodiment, R is a $C_{2-10}$ allylene group, $C_{6-14}$ arylene group, $C_{7-15}$ alkylenearylene group, or $C_{2-14}$ heterocyclic group.

In a specific embodiment, a sulfonate terminated polyarylate prepared from a polyarylate and the organic compound of formula (9a) by the above process comprises the structure of Formula (10a):

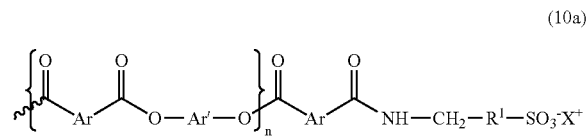

(10a)

where Ar and Ar' is a $C_{6-36}$ aryl group, n is 10 to 1,000, R' is an organic group of at least one carbon atom, and X is hydrogen, alkali metal or alkaline earth metal. In a specific embodiment, in the sulfonate terminated polyarylate of formula (10a), R' is a $C_{1-36}$ alkylene group, $C_{6-36}$ arylene group, $C_{7-36}$ alkylenearylene group, or $C_{1-36}$ heterocyclic group. In a more specific embodiment, R' is a $C_{1-10}$ alkylene group, $C_{6-14}$ arylene group, $C_{7-15}$ alkylenearylene group, or $C_{1-14}$ heterocyclic group.

In an exemplary embodiment, the sulfonate terminated polyarylate is derived from a resorcinol polyarylate as illustrated in formula (11):

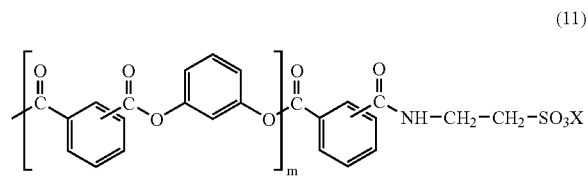

(11)

wherein m is as described for formula (8), and X is hydrogen, lithium, sodium, potassium, cesium, magnesium, calcium, or zinc.

In another exemplary embodiment, the sulfonate terminated polyarylate can comprise bisphenol A polyarylate as illustrated in formula (12):

stantially free of benzylic protons that can be detrimental to thermal stability. In an embodiment, the sulfonate terminated polyarylate resin prepared from such an organic compound and polyarylate has less than 1,000 ppm, specifically less than 750 ppm, and still more specifically less than 500 ppm by weight of benzylic protons. In addition, amino sulfonate compounds free of halogens such as bromine, chlorine and iodine can also be desirable, for instance where a halogen free composition is desired, such as where potential ecological benefits result. In an embodiment, the sulfonate terminated polyarylate resin prepared from such an organic compound and polyarylate has less than 1,000 ppm, specifically less than 750 ppm, and still more specifically less than 500 ppm by weight of halogen atoms. The sulfonate terminated polyarylate also contains a minimum amount of urethane linkages that can degrade to form isocyanates. Thus, in an embodiment, the sulfonate terminated polyarylate resin prepared from such organic compound and polyarylate has less than 1,000 ppm, specifically less than 750 ppm, and still more specifically less than 500 ppm by weight of urethane functional groups.

In an embodiment, the sulfonate terminated polyarylate has a melt flow rate (MFR) of 1.0 to 50.0 cc/10 min, specifically 1.0 to 20.0 cc/10 min, more specifically 1.2 to 10.0 cc/10 min, and still more specifically 1.3 to 5.0 cc/10 min at 300° C. under a load of 1.26 Kg when measured according to ASTM D1238-04.

In an embodiment, the sulfonate terminated polyarylate has a melt flow rate of 2.0 to 50.0 cc/10 min, specifically 3.0 to 20.0 cc/10 min, more specifically 2.5 to 10.0 cc/10 min, and still more specifically 2.51 to 9 cc/10 min at 330° C. under a load of 1.26 Kg when measured according to ASTM D1238-04.

The sulfonate terminated polyarylate has increased melt flow when compared to an identical (unmodified) polyarylate from which the sulfonate terminated polyarylate is derived, but without the sulfonate terminating groups. The increase in melt flow for the sulfonate terminated polyarylate, defined as a percentage, is determined according to the following equation (1):

Increase in MFR(%)=[MFR(after mod)/MFR(before mod)]×100     equation (1)

where MFR(after mod) is the MFR of the sulfonate terminated polyarylate, and MFR(before mod) is the MFR of the parent polyarylate prior to modifying with sulfonate terminating groups. In an embodiment, the increase in MFR is greater than or equal to 10%, specifically greater than or equal to 20%, based on melt flow rates of the sulfonate terminated

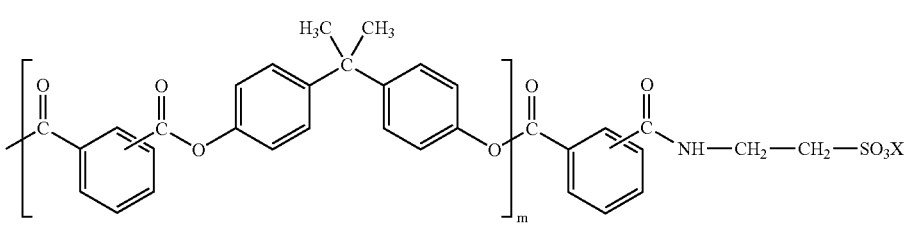

(12)

wherein m is as described for formula (8), and X is hydrogen, lithium, sodium, potassium, cesium, magnesium, calcium, or zinc.

In some cases it may be beneficial to have an organic compound containing amine and sulfonate functionality subpolyarylate and the polyarylate prior to modifying with sulfonate terminating groups, determined at a temperature of greater than or equal to about 300° C. under a load of 1.26 Kg according to ASTM D1238-04. In a specific embodiment, the increase in MFR is greater than or equal to 24%, specifically greater than or equal to 50%, and still more specifically greater than or equal to 65%, based on melt flow rates of the sulfonate terminated polyarylate and the polyarylate prior to modifying with sulfonate terminating groups, determined at a temperature of about 300° C. under a load of 1.26 Kg according to ASTM D1238-04. In another specific embodiment, the increase in MFR is greater than or equal to 100%, specifically greater than or equal to 150%, and still more specifically greater than or equal to 200%, based on melt flow rates of the sulfonate terminated polyarylate and the polyarylate prior to modifying with sulfonate terminating groups, determined at a temperature of about 330° C. under a load of 1.26 Kg according to ASTM D1238-04.

Incorporation of sulfonate functionality, either sulfonic acid or sulfonate salt, bonded to high Tg polymers can substantially modify polymer properties such as gas permeability, solubility and moisture absorption. For example, it has been observed (U.S. Pat. No. 7,148,314) that a melt process using 2-aminoethyl sulfonic acid (taurine) and taurine salts may be used to improve the flow of high Tg polyetherimide (PEI) resins. U.S. Pat. No. 4,588,805 describes a method of making sulfonate terminated polyimides by building polymer from the reaction of monomers such as 2,2-bis[4-(3,4-dicarboxyphenoxy)phenyl]propane dianhydride (also referred to as "bisphenol A dianhydride", abbreviated BPADA) and m-phenylenediamine (MPD) in the presence of the amino sulfonic acids or salts. However, such a process represents a complex series of steps to make a functionalized PEI, and is not generally extendable to polyarylates.

Surprisingly, it has been found that reaction of a polyarylate with an amino sulfonic acid or amino sulfonic acid salts gives improved flow by a simple melt process. In addition, the sulfonate terminated polyarylate prepared thereby can also desirably have improved stiffness (modulus) especially at temperatures above 160° C., as determined by a known method such as, for example, dynamic mechanical analysis (DMA).

The sulfonate terminated polyarylate is prepared by condensation with an amino sulfonic acid compound or derivative thereof, such as the salt of an amino sulfonic acid, all of which are also referred to herein generally as amino sulfonic compounds. In an embodiment, a useful amino sulfonic acid or derivative will have a primary aliphatic amine functionality and will be thermally stable at polyarylate melt processing temperatures, e.g., 225 to 400° C., and in some instances, above 300° C. Formation of the sulfonate polyarylate in the polymer melt avoids the use and recovery of solvents that are employed in other polyarylate chemical modifications.

Amino sulfonic acid salts can also be employed as the amino sulfonic compound, including alkaline and alkaline earth salts. The amino sulfonic acid or salt can be combined in the melt with polyarylate resins at from 0.01 to 10 wt % of the mixture, specifically from 0.1 to 2.0 wt %. Examples of suitable amino sulfonic compounds include, but are not limited to, 2-aminoethyl sulfonic acid; lithium, sodium, potassium, cesium, magnesium, calcium, or zinc 2-aminoethyl sulfonates; and mixtures thereof.

The polyarylate can be readily reacted with the amino sulfonic acids or salts in a melt reaction, such as extrusion, by combining the ingredients and melting and mixing in devices such as an extruder. It is believed that the amino sulfonic acid or salt chemically combines with the polyarylate to make a new resin that is end capped with the residue of the amino sulfonic acid or amino sulfonic acid salts reacting through the primary amino functionality. Melt processing the polyarylate mixture at temperatures, above the polyarylate Tg, in some instances from 225 to 400° C. and in other instances from 250 to 350° C., facilitates sulfonate terminated polyarylate resin formation. Formation of the sulfonate terminated polyarylate in the polymer melt avoids the use and recovery of solvents that are employed in other polyarylate chemical modifications.

In an alternate embodiment the amino sulfonic acid or salt may be introduced into a molten stream of polyarylate resin, for instance, by feeding into the throat of an extruder or down stream from the primary feed throat of an extruder. Dissolving the amino sulfonic acid or salt in a water solution to facilitate mixing with the polyarylate resin may facilitate the process of combining these ingredients. Small amounts of water do not appear to be unduly detrimental to the polymer under these conditions.

An advantage of using polyarylate resin in this process, rather than a polycarbonate or polyester carbonate resin, is that the resulting sulfonate salt resins have amide functionality, essentially free of urethane linkages (less than 1,000 ppm). Carbonate linkages would react with the amino sulfonate to form urethane linkages. Under the high temperatures needed to process high Tg (i.e., greater than 225° C.) polyarylate resin, urethane linkages can degrade to form isocyanates, which are undesirable as by-products as they may be harmful.

Once formed, the sulfonate terminated polyarylate can be used to prepare a thermoplastic composition. The thermoplastic composition can contain, in addition to the sulfonate terminated polyarylate one or more thermoplastic polymers. Examples of thermoplastic polymers that can be used include polycarbonates, including homopolycarbonates, copolycarbonates, polyester-polycarbonates; polyesters; polyimides including polyetherimides; polysiloxane-polyetherimides; addition polymers, of alkenylaromatic compounds, such as polystyrenes, and impact modified poly(alkenylaromatic) copolymers with ethylenically unsaturated nitriles or poly (meth)acrylates.

The thermoplastic polymer can include a polycarbonate. As used herein, the terms "polycarbonate" and "polycarbonate resin" mean compositions having repeating structural carbonate units of the formula (13):

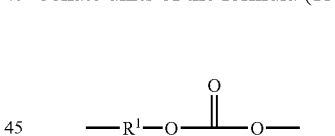

in which at least 60 percent of the total number of $R^1$ groups are aromatic organic radicals and the balance thereof are aliphatic, alicyclic, or aromatic radicals.

Polycarbonates may be produced by the interfacial reaction of dihydroxy compounds having the formula HO—$R^1$—OH, which includes dihydroxy compounds of formula (3), (4), (6), and (7), and exemplary dihydroxy compounds as described hereinabove.

In a specific embodiment, the polycarbonate is a linear homopolymer derived from bisphenol A. The polycarbonates may have a weight average molecular weight (Mw) of 10,000 to 100,000, as measured by gel permeation chromatography (GPC) using a crosslinked styrene-divinyl benzene column, at a sample concentration of 1 milligram per milliliter, and as calibrated with polycarbonate standards.

In an embodiment, polycarbonates have melt volume flow rates (often abbreviated as both MFR and MVR) measures the rate of extrusion of a thermoplastic through an orifice at a prescribed temperature and load. Polycarbonates may have an MVR, measured at 300° C. under a load of 1.2 kg according to ASTM D1238-04, of 0.5 to 80 cubic centimeters per 10 minutes (cc/10 min). Mixtures of polycarbonates of different flow properties may be used to achieve the overall desired flow property.

"Polycarbonates" and "polycarbonate resins" as used herein further include homopolycarbonates, copolymers comprising different $R^1$ moieties in the carbonate (referred to herein as "copolycarbonates"), copolymers comprising carbonate units and other types of polymer units, such as ester units of formula (1), polysiloxane units, and combinations comprising at least one of homopolycarbonates and copolycarbonates. As used herein, "combination" is inclusive of blends, mixtures, alloys, reaction products, and the like. A specific type of copolymer is a polyester carbonate, also known as a polyester-polycarbonate. Such copolymers further contain, in addition to recurring carbonate chain units of the formula (13), repeating ester units of formula (1) wherein D is a divalent group derived from a dihydroxy compound, and may be, for example, a $C_{2-10}$ alkylene group, a $C_{6-20}$ alicyclic group, a $C_{6-20}$ aromatic group or a polyoxyalkylene group; and T is a divalent group derived from a dicarboxylic acid, and may be, for example, a $C_{2-10}$ alkylene group, a $C_{6-20}$ alicyclic group, a $C_{6-20}$ alkyl aromatic group, or a $C_{6-20}$ aromatic group.

In an embodiment, for polyesters comprising ester groups of formula (1), D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Specific dicarboxylic acids are terephthalic acid, isophthalic acid, naphthalene dicarboxylic acid, cyclohexane dicarboxylic acid, or combinations thereof. In another specific embodiment, D is a $C_{2-6}$ alkylene group and T is p-phenylene, m-phenylene, naphthalene, a divalent cycloaliphatic group, or a combination thereof. This class of polyester includes the poly (alkylene terephthalates).

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A.

Polycarbonates, including polyester carbonates, can be manufactured by processes such as interfacial polymerization and melt polymerization, using methods known in the art.

In addition to the polycarbonates described above, combinations of the sulfonate terminated polyarylate resin with other thermoplastic polymers, for example polyesters, may be used. Polyesters can have the formula (1) wherein D is a divalent radical derived from a dihydroxy compound, and may be, for example, a $C_{2-36}$ alkylene group, a $C_{6-36}$ alicyclic group, a $C_{6-36}$ aromatic group or a polyoxyalkylene group in which the alkylene groups contain 2 to 6 carbon atoms, specifically 2, 3, or 4 carbon atoms.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching agent, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly (alkylene esters) including poly(alkylene arylates), and poly (cycloalkylene diesters). Aromatic polyesters may have a polyester structure according to formula (1), wherein D and T are each aromatic groups as described hereinabove. In an embodiment, the polyester is not identical to the polyarylate of the sulfonate terminated polyarylate resin. Also contemplated are aromatic polyesters with a minor amount, e.g., about 0.5 to about 10 wt %, based on the total weight of the polyester, of units derived from an aliphatic diacid and/or an aliphatic polyol to make copolyesters.

Poly(alkylene arylates) may have a polyester structure according to formula (1), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly (alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene)dimethylene. Examples of poly (alkylene terephthalates) include poly(ethylene terephthalate) (PET), poly(1,4-butylene terephthalate) (PBT), and poly (propylene terephthalate) (PPT). Also useful are poly (alkylene naphthoates), such as poly(ethylene naphthanoate) (PEN), and poly(butylene naphthanoate) (PBN). A useful poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other ester groups may also be useful. Useful ester units may include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s may also include poly(alkylene cyclohexanedicarboxylate)s. Of these, a specific example is poly(1,4-cyclohexanedimethanol-1,4-cyclohexanedicarboxylate) (PCCD), having recurring units of formula (14):

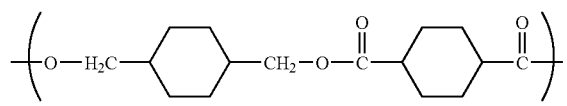

(14)

wherein, as described using formula (1), D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The polyester-polycarbonates may have a weight-average molecular weight (Mw) of 1,500 to 100,000, specifically 1,700 to 50,000, and more specifically 2,000 to 40,000. Molecular weight determinations are performed using gel permeation chromatography (GPC), using a crosslinked styrene-divinylbenzene column and calibrated to polycarbonate references. Samples are prepared at a concentration of about 1 mg/ml, and are eluted at a flow rate of about 1.0 ml/min.

Commercial polyester blends with polycarbonate are marketed under the trademark XYLEX®, including for example XYLEX® X7300 polymers, and commercial polyester-polycarbonates are marketed under the trademark LEXAN® SLX polymers, including for example LEXAN® SLX-9000, and are available from SABIC Innovative Plastics.

The thermoplastic composition may also comprise a polysiloxane-polycarbonate copolymer, also referred to as a polysiloxane-polycarbonate. The polysiloxane (also referred to herein as "polydiorganosiloxane") blocks of the copolymer comprise repeating siloxane units (also referred to herein as "diorganosiloxane units") of formula (15):

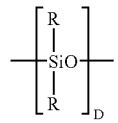

(15)

wherein each occurrence of R is same or different, and is a $C_{1-13}$ monovalent organic radical. For example, R may independently be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ arylalkyl group, $C_7$-$C_{13}$ arylalkoxy group, $C_7$-$C_{13}$ alkylaryl group, or $C_7$-$C_{13}$ alkylaryloxy group. The foregoing groups may be fully or partially halogenated with fluorine, chlorine, bromine, or iodine, or a combination thereof. Combinations of the foregoing R groups may be used in the same copolymer.

The value of D in formula (15) may vary widely depending on the type and relative amount of each component in the thermoplastic composition, the desired properties of the composition, and like considerations. Generally, D may have an average value of 2 to 1,000, specifically 2 to 500, and more specifically 5 to 100. In one embodiment, D has an average value of 10 to 75, and in still another embodiment, D has an average value of 40 to 60. Where D is of a lower value, e.g., less than 40, it may be desirable to use a relatively larger amount of the polycarbonate-polysiloxane copolymer. Conversely, where D is of a higher value, e.g., greater than 40, it may be necessary to use a relatively lower amount of the polycarbonate-polysiloxane copolymer.

Such dihydroxy polysiloxanes can be made by effecting a platinum catalyzed addition between a siloxane hydride of formula (16):

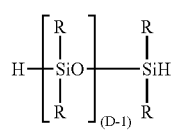

(16)

wherein R and D are as previously defined for formula (15), and an aliphatically unsaturated monohydric phenol. Useful aliphatically unsaturated monohydric phenols included, for example, eugenol, 2-allylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol. Mixtures comprising at least one of the foregoing may also be used.

The polysiloxane-polycarbonate may comprise 50 to 99 wt % of carbonate units and 1 to 50 wt % siloxane units. Within this range, the polysiloxane-polycarbonate copolymer may comprise 70 to 98 wt %, specifically 75 to 97 wt % of carbonate units and 2 to 30 wt %, specifically 3 to 25 wt % siloxane units.

In an embodiment, the polysiloxane-polycarbonate may comprise polysiloxane units, and carbonate units derived from bisphenol A. Polysiloxane-polycarbonates may have a weight average molecular weight of 2,000 to 100,000, specifically 5,000 to 50,000 as measured by gel permeation chromatography using a crosslinked styrene-divinyl benzene column, at a sample concentration of 1 milligram per milliliter, and as calibrated with polycarbonate standards.

The polysiloxane-polycarbonate can have a melt volume flow rate, measured at 300° C. under a load of 1.2 kg, of 1 to 50 cubic centimeters per 10 minutes (cc/10 min), specifically 2 to 30 cc/10 min. In an embodiment, exemplary polysiloxane-polycarbonates are marketed under the trade name LEXAN® EXL polycarbonates, available from SABIC Innovative Plastics.

Thermoplastic polyimides may also be included in the thermoplastic composition, specifically those having the general formula (17):

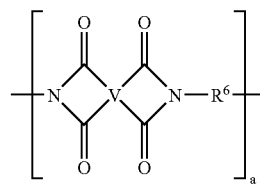

(17)

wherein a is greater than one. In an embodiment, a can be 10 to 1,000, and more specifically 10 to 500. Also in formula (17), V is a tetravalent linker without limitation, as long as the linker does not impede synthesis or use of the polyimide. Useful linkers include, but are not limited to substituted or unsubstituted, saturated, unsaturated or aromatic monocyclic and polycyclic groups having about 5 to about 50 carbon atoms; substituted or unsubstituted, linear or branched, saturated or unsaturated alkyl groups having 1 to about 30 carbon atoms; or a combination comprising at least one of the foregoing linkers. Useful substitutions and/or linkers include, but are not limited to, ethers, epoxides, amides, esters, polysiloxanes, and combinations comprising at least one of the foregoing. Exemplary linkers include, but are not limited to, tetravalent aromatic radicals of formula (18), such as:

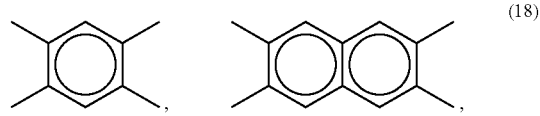

(18)

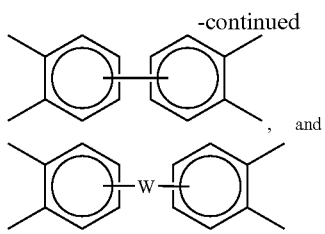

wherein W is a divalent moiety such as —O—, —S—, —C(O)—, —SO$_2$—, —SO—, and —C$_y$H$_{2y}$— (y being an integer of 1 to 5), and R$^6$ in formula (17) includes but is not limited to substituted or unsubstituted divalent organic radicals such as: aromatic hydrocarbon radicals having about 6 to about 20 carbon atoms and halogenated derivatives thereof; straight or branched chain alkylene radicals having about 2 to about 20 carbon atoms; cycloalkylene radicals having about 3 to about 20 carbon atoms; or divalent radicals of the general formula (19)

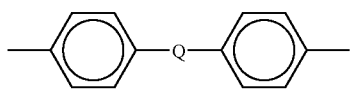

(19)

wherein Q is a divalent moiety comprising —O—, —S—, —C(O)—, —SO$_2$—, —SO—, —C$_y$H$_{2y}$— (y being an integer from 1 to 5).

In addition to polyimides described above, exemplary classes of polyimides also include, but are not limited to, polyamidimides, polyetherimides, polysiloxane-polyimides, and combinations comprising these. Specifically useful polyimides include those polyetherimides that are melt processable, such as those for which the preparation and properties are described in U.S. Pat. Nos. 3,803,085 and 3,905,942.

Polyetherimide resins useful herein comprise greater than 1, typically about 10 to about 1,000, and more specifically about 10 to about 500 structural units, of the formula (20):

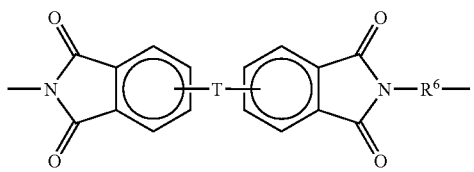

(20)

wherein T in formula (20) is —O— or a group of the formula —O—Z—O— wherein Z is a C$_{6-36}$ arylene or C$_{7-36}$ alkarylene, the divalent bonds of the —O— or the —O—Z—O— group are in the 3,3', 3,4', 4,3', or the 4,4' positions, and wherein R$^6$ is defined as described above.

Polyimides, including polyetherimides and polysiloxane-polyimides, can be prepared by any of a variety of methods known in the art, by condensation of a dianhydride with a diamine.

Polyimides as described herein can have a melt flow rate of about 0.1 to about 10 cubic centimeters per minute (cc/min), as measured by ASTM D1238-04 at 337° C., using a 6.6 kilogram (kg) weight. Polyimides, and in particular poly-etherimides, can have a weight average molecular weight (Mw) of about 10,000 to about 150,000 grams per mole (g/mol), as measured by gel permeation chromatography, using a polystyrene standard. Exemplary polyimides include polyetherimides such as ULTEM® 1000 and 1000LC, ULTEM® 1010, and ULTEM® 1040 polyetherimides all commercially available from SABIC Innovative Plastics.

The thermoplastic composition can comprise a poly(alkenyl aromatic) resin. The term "poly(alkenyl aromatic) resin" as used herein includes polymers prepared by methods known in the art including bulk, suspension, and emulsion polymerization, which contain at least 25% by weight of structural units derived from an alkenyl aromatic monomer of the formula (21):

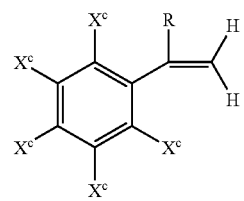

(21)

wherein each X$^c$ is independently hydrogen, C$_{1-12}$ alkyl, C$_{3-12}$ cycloalkyl, C$_{6-12}$ aryl, C$_{7-12}$ aralkyl, C$_{7-12}$ alkylaryl, C$_{1-12}$ alkoxy, C$_{3-12}$ cycloalkoxy, C$_{6-12}$ aryloxy, chloro, bromo, or hydroxy, and R is hydrogen, C$_{1-5}$ alkyl, bromo, or chloro. Exemplary alkenyl aromatic monomers that may be used include styrene, 3-methylstyrene, 3,5-diethylstyrene, 4-n-propylstyrene, alpha-methylstyrene, alpha-methyl vinyltoluene, alpha-chlorostyrene, alpha-bromostyrene, dichlorostyrene, dibromostyrene, tetra-chlorostyrene, and the like, and combinations comprising at least one of the foregoing compounds. Styrene and/or alpha-methylstyrene may be used as monomers copolymerizable with the conjugated diene monomer.

Preferred poly(alkenyl aromatic) resins include atactic and syndiotactic homopolystyrenes. Atactic homopolystyrenes are commercially available as, for example, EB3300 from Chevron, and P1800 from BASF. Syndiotactic homopolystyrenes are commercially available as, for example, from Dow Chemical Company and from Idemitsu Kosan Company, Ltd. Preferred poly(alkenyl aromatic) resins further include the rubber-modified polystyrenes, also known as high-impact polystyrenes or HIPS, comprising about 88 to about 94 weight percent polystyrene and about 6 to about 12 weight percent polybutadiene, with an effective gel content between 10 and 35%. These rubber-modified polystyrenes are commercially available as, for example, GEH 1897 from SABIC Innovative Plastics, and BA 5350 from Chevron.

In addition to the sulfonate terminated polyarylate and any thermoplastic polymers the thermoplastic composition may further include various other additives ordinarily incorporated with thermoplastic compositions of this type, with the proviso that the additives are selected so as not to adversely affect the desired properties of the thermoplastic composition. Mixtures of additives may be used. Such additives may be mixed at a suitable time during the mixing of the components for forming the thermoplastic composition.

For example, the thermoplastic composition can further include an impact modifier(s). Suitable impact modifiers are typically high molecular weight elastomeric materials derived from olefins, monovinyl aromatic monomers, acrylic and methacrylic acids and their ester derivatives, as well as conjugated dienes. The polymers formed from conjugated dienes can be fully or partially hydrogenated. The elastomeric materials can be in the form of homopolymers or copolymers, including random, block, radial block, graft, and core-shell copolymers. Combinations of impact modifiers can be used.

A specific type of impact modifier is an elastomer-modified graft copolymer comprising an elastomeric (i.e., rubbery) polymer substrate having a Tg less than about 10° C., more specifically less than about −10° C., or more specifically about −40° to −80° C., and (ii) a rigid polymeric superstrate grafted to the elastomeric polymer substrate. Materials suitable for use as the elastomeric phase include, for example, conjugated diene rubbers, for example polybutadiene and polyisoprene; copolymers of a conjugated diene with less than about 50 wt % of a copolymerizable monomer, for example a monovinylic compound such as styrene, acrylonitrile, n-butyl acrylate, or ethyl acrylate; olefin rubbers such as ethylene propylene copolymers (EPR) or ethylene-propylene-diene monomer rubbers (EPDM); ethylene-vinyl acetate rubbers; silicone rubbers; elastomeric $C_{1-8}$ alkyl (meth)acrylates; elastomeric copolymers of $C_{1-8}$ alkyl (meth)acrylates with butadiene and/or styrene; or combinations comprising at least one of the foregoing elastomers. Materials suitable for use as the rigid phase include, for example, monovinyl aromatic monomers such as styrene and alpha-methyl styrene, and monovinylic monomers such as acrylonitrile, acrylic acid, methacrylic acid, and the $C_{1-6}$ esters of acrylic acid and methacrylic acid, specifically methyl methacrylate.

Specific exemplary elastomer-modified graft copolymers include those formed from styrene-butadiene-styrene (SBS), styrene-butadiene rubber (SBR), styrene-ethylene-butadiene-styrene (SEBS), acrylonitrile-butadiene-styrene (ABS), acrylonitrile-ethylene-propylene-diene-styrene (AES), styrene-isoprene-styrene (SIS), methyl methacrylate-butadiene-styrene (MBS), and styrene-acrylonitrile (SAN). Impact modifiers, where included, are generally used in amounts of about 1 to about 50 parts by weight, based on 100 parts by weight of sulfonate terminated polyarylate, and any additional polymer.

The thermoplastic composition may include fillers or reinforcing agents with the proviso that the additives are selected so as not to adversely affect the desired properties of the thermoplastic composition.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (atmospheres), or the like; kaolin, including hard kaolin, soft kaolin, calcined kaolin, kaolin comprising various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising at least one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming non-melting fibers such as poly(ether ketone), polyimide, polybenzoxazole, polytetrafluoroethylene, or the like; as well as additional fillers and reinforcing agents such as mica, clay, feldspar, flue dust, finite, quartz, quartzite, perlite, tripoli, diatomaceous earth, carbon black, or the like, or combinations comprising at least one of the foregoing fillers or reinforcing agents.

The fillers and reinforcing agents can be coated with a layer of metallic material to facilitate conductivity, or surface treated with silanes to improve adhesion and dispersion with the polymeric matrix resin. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers, where included, are generally used in amounts of about 1 to about 20 parts by weight, based on 100 parts by weight of sulfonate terminated polyarylate, and any additional polymer.

Colorants such as pigment and/or dye additives can also be present. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amounts of about 0.001 to about 3 parts by weight, based on 100 parts by weight of sulfonate terminated polyarylate, and any additional polymer.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3'''',5''''-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising at least one of the foregoing dyes. Dyes are generally used in amounts of about 0.0001 to about 5 parts by weight, based on 100 parts by weight of sulfonate terminated polyarylate, and any additional polymer.

The thermoplastic composition can include an antioxidant. Useful antioxidant additives include, for example, organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis [methylene(3,5-di-tert-butyl-4-hydroxyhydrocinnamate)] methane, or the like; butylated reaction products of paracresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising at least one of the foregoing antioxidants. Antioxidants can be used in amounts of 0.0001 to 1 percent by weight, based on the total weight of sulfonate terminated polyarylate and any additional polymer.

Useful heat stabilizer additives include, for example, organophosphites such as triphenyl phosphite, tris-(2,6-dimethylphenyl)phosphite, tris-(mixed mono- and di-nonylphenyl) phosphite or the like; or combinations comprising at least one of the foregoing heat stabilizers. Heat stabilizers can be used in amounts of 0.0001 to 1 percent by weight, based on the total weight of sulfonate terminated polyarylate and any additional polymer.

Light stabilizers and/or ultraviolet light (UV) absorbing additives may also be used. Useful light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising at least one of the foregoing light stabilizers. Light stabilizers can be used in amounts of 0.01 to 5.0 percent by weight, based on the total weight of sulfonate terminated polyarylate and any additional polymer.

Useful UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB® 5411); 2-hydroxy-4-n-octyloxybenzophenone (CYASORB® 531); 2-[4,6-bis(2,4-dimethylphenyl)-1, 3,5-triazin-2-yl]-5-(octyloxy)-phenol (CYASORB® 1164); 2,2'-(1,4-phenylene)bis(4H-3,1-benzoxazin-4-one) (CYASORB® UV-3638); 1,3-bis[(2-cyano-3,3-diphenylacryloyl) oxy]-2,2-bis[[(2-cyano-3,3-diphenylacryloyl)oxy]methyl] propane (UVINUL® 3030); 2,2'-(1,4-phenylene) bis(4H-3, 1-benzoxazin-4-one); 1,3-bis[(2-cyano-3,3-diphenylacryloyl)oxy]-2,2-bis[[(2-cyano-3,3-diphenylacryloyl)oxy]methyl]propane; nano-size inorganic materials such as titanium oxide, cerium oxide, and zinc oxide, all with particle size less than 100 nanometers; or the like, or combinations comprising at least one of the foregoing UV absorbers. UV absorbers can be used in amounts of 0.0001 to 1 percent by weight, based on the total weight of sulfonate terminated polyarylate and any additional polymer.

Plasticizers, lubricants, and/or mold release agents additives may also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate; stearyl stearate, pentaerythritol tetrastearate, and the like; mixtures of methyl stearate and hydrophilic and hydrophobic nonionic surfactants comprising polyethylene glycol polymers, polypropylene glycol polymers, and copolymers thereof, e.g., methyl stearate and polyethylene-polypropylene glycol copolymers in a suitable solvent; waxes such as beeswax, montan wax, paraffin wax or the like. Such materials can be used in amounts of 0.001 to 1 percent by weight, based on the total weight of sulfonate terminated polyarylate and any additional polymer.

The thermoplastic composition can include antistatic agents. The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising at least one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT® 6321 (Sanyo) or PEBAX® MH1657 (Atofina), IRGASTAT® P18 and P22 (Ciba-Geigy). Other polymeric materials that may be used as antistatic agents are inherently conducting polymers such as polyaniline (commercially available as PANIPOL®EB from Panipol), polypyrrole, and polythiophenes such as for example poly(3,4-ethylenedioxythiophene) (commercially available from H.C. Stark), which retain some of their intrinsic conductivity after melt processing at elevated temperatures. In one embodiment, carbon fibers, carbon nanofibers, carbon nanotubes, carbon black, or any combination of the foregoing may be used in a polymeric resin containing chemical antistatic agents to render the composition electrostatically dissipative. Antistatic agents can be used in amounts of 0.0001 to 5 percent by weight, based on the total weight of sulfonate terminated polyarylate and any additional polymer.

The thermoplastic composition can include flame retardants. Flame retardant that may be added may be organic compounds that include phosphorus, bromine, and/or chlorine. Non-brominated and non-chlorinated phosphorus-containing flame retardants may be preferred in certain applications for regulatory reasons, for example organic phosphates and organic compounds containing phosphorus-nitrogen bonds.

One type of exemplary organic phosphate is an aromatic phosphate of the formula $(GO)_3P=O$, wherein each G is independently an alkyl, cycloalkyl, aryl, alkylaryl, or arylalkyl group, provided that at least one G is an aromatic group. Two of the G groups may be joined together to provide a cyclic group, for example, diphenyl pentaerythritol diphosphate. Other useful aromatic phosphates may be, for example, phenyl bis(dodecyl) phosphate, phenyl bis(neopentyl) phosphate, phenyl bis(3,5,5'-trimethylhexyl) phosphate, ethyl diphenyl phosphate, 2-ethylhexyl di(p-tolyl) phosphate, bis (2-ethylhexyl) p-tolyl phosphate, tritolyl phosphate, bis(2-ethylhexyl)phenyl phosphate, tri(nonylphenyl) phosphate, bis(dodecyl) p-tolyl phosphate, dibutyl phenyl phosphate, 2-chloroethyl diphenyl phosphate, p-tolyl bis(2,5,5'-trimethylhexyl) phosphate, 2-ethylhexyl diphenyl phosphate, or the like. A specific aromatic phosphate is one in which each G is aromatic, for example, triphenyl phosphate, tricresyl phosphate, isopropylated triphenyl phosphate, and the like.

Di- or polyfunctional aromatic phosphorus-containing compounds are also useful, for example, compounds of the formulas below:

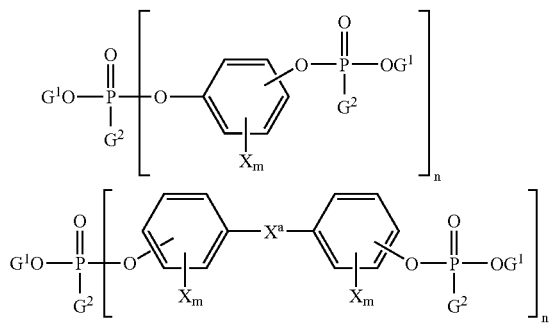

-continued

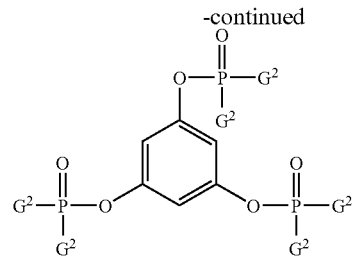

wherein each $G^1$ is independently a hydrocarbon having 1 to 30 carbon atoms; each $G^2$ is independently a hydrocarbon or hydrocarbonoxy having 1 to 30 carbon atoms; each $X^a$ is independently a hydrocarbon having 1 to 30 carbon atoms; each X is independently a bromine or chlorine; m is 0 to 4, and n is 1 to 30. Examples of useful di- or polyfunctional aromatic phosphorus-containing compounds include resorcinol tetraphenyl diphosphate (RDP), the bis(diphenyl) phosphate of hydroquinone and the bis(diphenyl) phosphate of bisphenol A, respectively, their oligomeric and polymeric counterparts, and the like.

Exemplary flame retardant compounds containing phosphorus-nitrogen bonds include phosphonitrilic chloride, phosphorus ester amides, phosphoric acid amides, phosphonic acid amides, and phosphinic acid amides. When present, phosphorus-containing flame retardants can be present in amounts of 0.1 to 10 percent by weight, based on the total weight of sulfonate terminated polyarylate and any additional polymer.

Halogenated materials may also be used as flame retardants, for example halogenated compounds and resins of formula (22):

(22)

wherein R is an alkylene, alkylidene or cycloaliphatic linkage, e.g., methylene, ethylene, propylene, isopropylene, isopropylidene, butylene, isobutylene, amylene, cyclohexylene, cyclopentylidene, or the like; or an oxygen ether, carbonyl, amine, or a sulfur containing linkage, e.g., sulfide, sulfoxide, sulfone, or the like. R can also consist of two or more alkylene or alkylidene linkages connected by such groups as aromatic, amino, ether, carbonyl, sulfide, sulfoxide, sulfone, or the like.

Ar and Ar' in formula (22) are each independently mono- or polycarbocyclic aromatic groups such as phenylene, biphenylene, terphenylene, naphthylene, or the like. Also in formula (22), Y is an organic, inorganic, or organometallic radical, for example: halogen, e.g., chlorine, bromine, iodine, fluorine; ether groups of the general formula OE, wherein E is a monovalent hydrocarbon radical similar to X; monovalent hydrocarbon groups of the type represented by R; or other substituents, e.g., nitro, cyano, and the like, said substituents being essentially inert provided that there is at least one and preferably two halogen atoms per aryl nucleus.

When present, each X is independently a monovalent hydrocarbon group, for example an alkyl group such as methyl, ethyl, propyl, isopropyl, butyl, decyl, or the like; an aryl groups such as phenyl, naphthyl, biphenyl, xylyl, tolyl, or the like; and arylalkyl group such as benzyl, ethylphenyl, or the like; a cycloaliphatic group such as cyclopentyl, cyclohexyl, or the like. The monovalent hydrocarbon group may itself contain inert substituents.

Each d is independently 1 to a maximum equivalent to the number of replaceable hydrogens substituted on the aromatic rings comprising Ar or Ar'. Each e is independently 0 to a maximum equivalent to the number of replaceable hydrogens on R. Each a, b, and c is independently a whole number, including 0. When b is not 0, neither a nor c may be 0. Otherwise either a or c, but not both, may be 0. Where b is 0, the aromatic groups are joined by a direct carbon-carbon bond.

The hydroxyl and Y substituents on the aromatic groups, Ar and Ar', can be varied in the ortho, meta or para positions on the aromatic rings and the groups can be in any possible geometric relationship with respect to one another.

Included within the scope of the above formula are bisphenols of which the following are representative: 2,2-bis-(3,5-dichlorophenyl)-propane; bis-(2-chlorophenyl)-methane; bis (2,6-dibromophenyl)-methane; 1,1-bis-(4-iodophenyl)-ethane; 1,2-bis-(2,6-dichlorophenyl)-ethane; 1,1-bis-(2-chloro-4-iodophenyl)ethane; 1,1-bis-(2-chloro-4-methylphenyl)-ethane; 1,1-bis-(3,5-dichlorophenyl)-ethane; 2,2-bis-(3-phenyl-4-bromophenyl)-ethane; 2,6-bis-(4,6-dichloronaphthyl)-propane; 2,2-bis-(2,6-dichlorophenyl)-pentane; 2,2-bis-(3,5-dibromophenyl)-hexane; bis-(4-chlorophenyl)-phenyl-methane; bis-(3,5-dichlorophenyl)-cyclohexylmethane; bis-(3-nitro-4-bromophenyl)-methane; bis-(4-hydroxy-2,6-dichloro-3-methoxyphenyl)-methane; and 2,2-bis-(3,5-dichloro-4-hydroxyphenyl)-propane 2,2 bis-(3-bromo-4-hydroxyphenyl)-propane. Also included within the above structural formula are: 1,3-dichlorobenzene, 1,4-dibromobenzene, 1,3-dichloro-4-hydroxybenzene, and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like.

Also useful are oligomeric and polymeric halogenated aromatic compounds, such as a copolycarbonate of bisphenol A and tetrabromobisphenol A and a carbonate precursor, e.g., phosgene. Metal synergists, e.g., antimony oxide, may also be used with the flame retardant. When present, halogen containing flame retardants can be present in amounts of 0.1 to 10 percent by weight, based on the total weight of sulfonate terminated polyarylate and any additional polymer.

The thermoplastic composition can include an anti-drip agent. Anti-drip agents may be, for example, a fibril forming or non-fibril forming fluoropolymer such as polytetrafluoroethylene (PTFE). The anti-drip agent may be encapsulated by a rigid copolymer as described above, for example styrene-acrylonitrile copolymer (SAN). PTFE encapsulated in SAN is known as TSAN. Encapsulated fluoropolymers may be made by polymerizing the encapsulating polymer in the presence of the fluoropolymer, for example an aqueous dispersion. TSAN may provide significant advantages over PTFE, in that TSAN may be more readily dispersed in the composition. A useful TSAN may comprise, for example, 50 wt % PTFE and 50 wt % SAN, based on the total weight of the encapsulated fluoropolymer. The SAN may comprise, for example, 75 wt % styrene and 25 wt % acrylonitrile based on the total weight of the copolymer. Alternatively, the fluoropolymer may be pre-blended in some manner with a second polymer, such as for, example, an aromatic polycarbonate resin or SAN to form an agglomerated material for use as an anti-drip agent. Either method may be used to produce an encapsulated fluoropolymer. Antidrip agents can be used in amounts of 0.1 to 5 percent by weight, based on the total weight of sulfonate terminated polyarylate and any additional polymer.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9-decen-1-ol, as well as tertiary alcohols that have at least one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—CH$_2$OH) or it can be a member of a more complex hydrocarbon group such as —CR$^4$HOH or —CR$_2^4$OH wherein R$^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl alcohol. 2-Methyl-2,4-pentanediol, polyethylene glycol, and polypropylene glycol are often used for gamma-radiation stabilization. Gamma-radiation stabilizing compounds are typically used in amounts of 0.05 to 1 parts by weight, based on the total weight of sulfonate terminated polyarylate and any additional polymer.

While it is contemplated that other resins and or additives may be used in the thermoplastic compositions described herein, such additives while desirable in some embodiments are not essential.

The thermoplastic composition may be manufactured by methods generally available in the art, for example, in one embodiment, in one manner of proceeding, sulfonate terminated polyarylate and other optional components are first blended in a HENSCHEL-Mixer® high speed mixer. Other low shear processes including but not limited to hand mixing may also accomplish this blending. The blend is then fed into the throat of an extruder via a hopper. Alternatively, one or more of the components may be incorporated into the composition by feeding directly into the extruder at the throat and/or downstream through a sidestuffer. Additives may also be compounded into a masterbatch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate may be one-fourth inch long or less as desired. Such pellets may be used for subsequent molding, shaping, or forming.

In a specific embodiment, a method of preparing a thermoplastic composition comprises melt combining a sulfonate terminated polyarylate, an additional polymer such as a polyimide, and any further additives. The melt combining can be done by extrusion. In an embodiment, the proportions of sulfonate terminated polyarylate, an additional polymer such as a polyimide, and any further additives are selected such that the melt flow properties of the thermoplastic composition at a desirable level.

In a specific embodiment, the extruder is a twin-screw extruder. The extruder is typically operated at a temperature of 180 to 385° C., specifically 200 to 350° C., more specifically 250 to 330° C., wherein the die temperature may be different. The extruded thermoplastic composition is quenched in water and pelletized.

Shaped, formed, or molded articles comprising the thermoplastic compositions are also provided. The thermoplastic compositions may be molded into useful shaped articles by a variety of means such as injection molding, extrusion, rotational molding, blow molding and thermoforming. In a specific embodiment, molding is done by injection molding. Desirably, the thermoplastic composition has excellent mold filling capability.

The thermoplastic composition is useful to form an article such as, for example, a film, sheet, fiber or adhesive containing the sulfonate terminated polyarylate.

The sulfonate-terminated polyarylate resin composition and method of making are further illustrated by the following non-limiting examples.

The ingredients of the examples shown below in Table 1 were first tumble blended in a paint shaker, then compounded on a 30 mm Werner & Pfleiderer co-rotating twin screw extruder, with a vacuum vented mixing screw. The barrel and die head temperatures were maintained between 285 and 300° C. at a screw speed of 250 to 300 rpm. The twin-screw extruder had enough distributive and dispersive mixing elements to produce good mixing of the polymer compositions. The extrudate was cooled through a water bath prior to pelletizing.

Melt flow rate (MFR) was measured as per ASTM D1238-04 at 300 and 330° C. under a load of 1.26 Kg, and is reported in cubic centimeters of extrudate passed in 10 minutes (cc/10 min.). Samples were dried for at least 2 hours at 150° C. prior to testing. Melt viscosity (MV-M) was measured on a capillary rheometer. Shear viscosity of the sulfonate polyarylate resins was measured versus shear rate on a Goettfert 2001 rheometer operating at 300° C. using a capillary with a length to diameter ratio of 30:1 (30×1.0 mm). Shear viscosity was recorded at a shear rate of 24 to 7005 sec$^{-1}$, as indicated in Table 1. Molecular weights were determined by gel permeation chromatography (GPC) using a crosslinked styrene-divinylbenzene column, with tetrahydrofuran as an eluant operating at a flow rate of about 1.0 mL/min, and calibrated to polystyrene standards. Tg was measured by differential scanning calorimetry (DSC) on the second heat using a 20° C./min heating rate.

Examples 1 and 2, and Comparative Example. Examples 1 and 2 were prepared by melt processing (extrusion) of a 50% aqueous solution of the sodium salt of amino ethyl sulfonic acid (also referred to as sodium taurate) with polyarylate pellets (Poly(4,4'-isopropylidenediphenylene terephthalate/isophthalate) copolymer U100, available from Unitika), in the proportions shown (in parts by weight, pbw) in Table 1. The components were mixed prior to extrusion. The Comparative Example was prepared by extrusion of the polyarylate pellets alone.

TABLE 1

| | Comparative Example | Example 1 | Example 2 |
|---|---|---|---|
| Polyarylate (pbw) | 100 | 99.5 | 99.0 |
| 50 wt % aq. sodium taurate (pbw) | — | 0.5 | 1.0 |
| MV-M at 300° C. | Melt viscosity (Pa-s) | | |
| shear rate (sec$^{-1}$) | (Polyarylate only) | 0.25 pbw sodium taurate | 0.50 pbw sodium taurate |
| 24 | 2396 | 1205 | 1076 |
| 49 | 2403 | 1313 | 961 |
| 97 | 2181 | 1223 | 922 |
| 195 | 1860 | 1099 | 857 |
| 292 | 1635 | 1018 | 795 |
| 499 | 1337 | 878 | 701 |
| 645 | 1187 | 804 | 646 |
| 997 | 956 | 671 | 554 |
| 1496 | 769 | 547 | 456 |
| 3004 | 492 | 358 | 305 |
| 5011 | 337 | 237 | 205 |
| 7005 | 259 | 185 | 162 |
| Tg (° C.; DSC, 20° C./min) | 191.7 | 189.5 | 186.8 |
| MFR (300° C., 1.26 Kg, cc/10 min) | 1.06 | 1.31 | 1.71 |
| MFR (330° C., 1.26 Kg, cc/10 min) | 2.51 | 6.22 | 8.17 |
| Mw (g/mol) | 22,723 | 20,201 | 18,725 |
| Mn (g/mol) | 11,414 | 10,292 | 9,360 |

Table 1 shows the effects of the use of 2-aminoethane sulfonic acid (as its sodium salt), on the melt flow of the commercial polyarylate. Examples 1 and 2 demonstrate moderately increased melt flow at 300° C. relative to the polyarylate-only Comparative Example (1.31-1.71 cc/10 min. compared to a baseline 1.06 cc/10 min, respectively), of about 24% and 65% respectively. Similarly, Examples 1 and 2 demonstrate substantially increased melt flow at 330° C. relative to the polyarylate-only Comparative Example (6.22-8.17 cc/10 min. compared to a baseline 2.51 cc/10 min, respectively), of about 164% and 225% respectively. Thus, the use of the sodium taurate significantly increases the melt flow of the sulfonate terminated polyarylate. The use of the sodium taurate also has an effect on the weight and number averaged molecular weights, resulting in, for example, an Mw decrease of 2,522 g/mol for Example 1 (with 0.25 pbw added sodium taurate), and 3,998 g/mol for Example 2 (with 0.5 pbw added sodium taurate); however, this reduction is small relative to the effect of the taurate end groups on the viscosity.

In addition, as shown in Table 1 and as plotted in the FIGURE, shear viscosity (measured viscosity according to shear rate) is reduced (i.e., melt flow is improved) by addition of sodium taurate. The shear viscosity can clearly be seen in the FIGURE to demonstrate less shear thinning and is more constant over the measured range from low to high shear of 1205 to 185 Pa-s (for Example 1) and 1076 to 162 Pa-s (for Example 2), compared to 2396 to 256 Pa-s (for the Comparative Example). The shear viscosity is thus proportionally greater for the unmodified polyarylate of the Comparative Example than for the modified polyarylates of Examples 1 or 2.

Table 2 shows the modulus measured in MPa vs. temperature for the unmodified polyarylate (Comparative Example) compared to that of the sulfonate modified polyarylate resins of Examples 1 and 2. The modulus was measured at various temperatures using dynamic mechanical analysis methods on a 3.2 mm×63.5 mm injection molded bars according to the method described in ASTM D5418 at a heating rate of 3° C./min and a flex rate of 1 Hertz.

TABLE 2

| °C. | Comparative Example Modulus (MPa) | Example 1 Modulus (MPa) | Example 2 Modulus (MPa) |
|---|---|---|---|
| 40 | 1681 | 1749 | 1747 |
| 50 | 1623 | 1687 | 1685 |
| 60 | 1501 | 1618 | 1601 |
| 70 | 1442 | 1549 | 1515 |
| 80 | 1402 | 1491 | 1461 |
| 90 | 1369 | 1445 | 1434 |

TABLE 2-continued

| °C. | Comparative Example Modulus (MPa) | Example 1 Modulus (MPa) | Example 2 Modulus (MPa) |
|---|---|---|---|
| 100 | 1347 | 1410 | 1400 |
| 110 | 1331 | 1380 | 1377 |
| 120 | 1320 | 1359 | 1361 |
| 130 | 1314 | 1347 | 1351 |
| 140 | 1316 | 1336 | 1356 |
| 150 | 1323 | 1342 | 1369 |
| 160 | 1295 | 1359 | 1360 |
| 170 | 918 | 1262 | 1281 |
| 180 | 281 | 681 | 875 |

It can be seen in Table 2 that the higher flow resins of Examples 1 and 2 also have consistently higher stiffness (i.e., higher modulus) than the unmodified Comparative Example, especially at temperatures above 160° C. Modification of the polyarylate resin with an amino sulfonic compound thereby both increases the melt flow for the molten resin, and increases the resulting modulus for the sulfonate terminated resin formed into molded articles.

Compounds are described herein using standard nomenclature. A dash ("-") or wavy line that is not between two letters or symbols is used to indicate a point of attachment for a substituent. The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

We claim:

1. A process for preparing a sulfonate terminated polyarylate, comprising:
melt blending a polyarylate resin with an organic compound to form a reaction mixture, wherein the organic compound contains at least one aliphatic primary amine functional group and at least one other functional group selected from the group consisting of sulfonic acids, sulfonic acid salts, and mixtures thereof, and heating the reaction mixture to a temperature of 225 to 400° C., wherein the organic compound has the structure:

XO$_3$S—R—NH$_2$

Wherein X is a hydrogen or a metal and wherein R of the organic compound contains at least two carbon atoms, and wherein the organic compound is included in the reaction mixture as an aqueous solution.

2. The process of claim 1, wherein R is a C$_{2-36}$ alkylene group, C$_{6-36}$ arylene group, C$_{7-36}$ alkylenearylene group, or C$_{2-36}$ heterocyclic group.

3. The process of claim 1, wherein the organic compound has the structure:

XO$_3$S—R'—CH$_2$NH$_2$ wherein X is H or a metal and wherein R' of the organic compound contains at least one carbon atom.

4. The process of claim 3, wherein R' is a C$_{1-36}$ alkylene group, C$_{6-36}$ arylene group, C$_{7-36}$ alkylenearylene group, or C$_{1-36}$ heterocyclic group.

5. The process of claim 1 wherein the organic compound is present in an amount of 0.1 to 10.0 wt % based on the total weight of the reaction mixture.

6. The process of claim 1 wherein the organic compound is present in the aqueous solution in an amount of greater than or equal to 25 wt % based on the total weight of the aqueous solution.

7. The process of claim 1 wherein the organic compound is selected from the group consisting of 2-aminoethyl sulfonic acid, alkali metal salts of 2-aminoethyl sulfonic acid, alkaline earth metal salts of 2-aminoethyl sulfonic acid and mixtures thereof.

8. The process of claim 1 wherein the polyarylate resin has a weight average molecular weight from 5,000 to 100,000 g/mol.

9. The process of claim 1 wherein the polyarylate resin has a Tg of from 150 to 300° C.

10. The process of claim 1 wherein the sulfonate terminated polyarylate resin has less than 1,000 ppm of benzylic protons.

11. The process of claim 1 wherein the sulfonate terminated polyarylate resin has less than 1,000 ppm of halogen atoms.

12. The process of claim 1 wherein the sulfonate terminated polyarylate resin has less than 1,000 ppm of urethane functional groups.

13. A process for preparing a sulfonate terminated polyarylate, comprising:
melt blending a polyarylate resin with an organic compound to form a reaction mixture, wherein the organic compound contains at least one aliphatic primary amine functional group and at least one other functional group selected from the group consisting of sulfonic acids, sulfonic acid salts, and mixtures thereof, and heating the reaction mixture to a temperature of 225 to 400° C., wherein the organic compound has the structure:

XO$_3$S—R—NH$_2$

Wherein X is a hydrogen or a metal and wherein R of the organic compound contains at least two carbon atoms, and wherein the organic compound is included in the reaction mixture as an aqueous solution, and
wherein the sulfonate terminated polyarylate resin has less than 1,000 ppm of urethane functional groups.

14. The process of claim 1 wherein the sulfonate terminated polyarylate has an increase in melt flow rate of greater than or equal to 1000, based on the melt flow rates of the sulfonate terminated polyarylate and the polyarylate resin as determined at a temperature of 300° C. under a load of 1.26 Kg according to ASTM D1238-04.

15. A process for preparing a sulfonate terminated polyarylate, comprising:
blending a polyarylate resin with an organic compound to form a reaction mixture, wherein the organic compound contains at least one aliphatic primary amine functional group and at least one other functional group selected from the group consisting of sulfonic acids, sulfonic acid salts, and mixtures thereof, and heating the reaction mixture to a temperature of 225 to 400° C., wherein the organic compound has the structure:

XO$_3$S—R—NH$_2$ wherein X is a hydrogen or a metal and wherein R of the organic compound contains at least two carbon atoms, and wherein the organic compound is included in the reaction mixture as an aqueous solution, and
wherein the sulfonate terminated polyarylate resin has less than 1,000 ppm of urethane functional groups.

* * * * *